US006902755B2

(12) United States Patent
Horn

(10) Patent No.: US 6,902,755 B2
(45) Date of Patent: Jun. 7, 2005

(54) METHOD AND APPARATUS OF CHILLING SLURRIES AND LIQUIDS

(75) Inventor: Darrell C. Horn, Santa Rosa, CA (US)

(73) Assignee: Blentech Corporation, Rohnert Park, CA (US)

( * ) Notice: Subject to any disclaimer, the term of this patent is extended or adjusted under 35 U.S.C. 154(b) by 317 days.

(21) Appl. No.: 10/149,076

(22) PCT Filed: Jan. 3, 2001

(86) PCT No.: PCT/US01/00215

§ 371 (c)(1),
(2), (4) Date: Jun. 6, 2002

(87) PCT Pub. No.: WO01/49134

PCT Pub. Date: Jul. 12, 2001

(65) Prior Publication Data

US 2002/0192342 A1 Dec. 19, 2002

Related U.S. Application Data

(60) Provisional application No. 60/174,422, filed on Jan. 4, 2000.

(51) Int. Cl.[7] .............................. A23L 3/00; F25B 19/00

(52) U.S. Cl. ........................... 426/524; 62/100; 62/169; 62/268; 99/472

(58) Field of Search ................................ 426/524, 519; 99/472; 62/100, 169, 268, 331; 366/278

(56) References Cited

U.S. PATENT DOCUMENTS 5,228,775 A  *  7/1993  Horn et al. .................. 366/278
5,589,214 A  * 12/1996  Palm .......................... 426/506

* cited by examiner

*Primary Examiner*—George C. Yeung
(74) *Attorney, Agent, or Firm*—Craig M. Stainbrook; Larry D. Johnson; Johnson & Stainbrook, LLP

(57) ABSTRACT

A method and apparatus for rapidly chilling liquid or slurried food products through a two-stage sequence of jacket cooling followed by vacuum chilling. Slurry and liquid food products heated in a batch are chilled by first employing a chilled liquid flowing through a double walled jacket (22) surrounding the vessel chamber (17). When the food product reaches a temperature at which jacket cooling becomes inefficient, this is followed by pulling a vacuum in the space above the product to vacuum cool the product to the desired chilled temperature.

14 Claims, 5 Drawing Sheets

METHOD AND APPARATUS OF CHILLING SLURRIES AND LIQUIDS

This application is a national stage filing under 35 U.S.C. 371 of PCT/US01/00215 which claims the benefit of Provisional Application No. 60/174,422, filed Jan. 4, 2000.

BACKGROUND OF THE INVENTION

1. Technical Field

The present invention relates generally to methods and devices for chilling food products, and more particularly to a method and apparatus for rapidly chilling liquid or slurried food products through a two-stage sequence of jacket cooling followed by vacuum chilling.

2. Background Art

Food products must be cooled after cooking to prevent pathogens from getting into the product and propagating. It is generally accepted that to keep food products safe for human consumption they must be chilled from the cooking temperature to or below 5° C. in no more than 90 minutes. This rapid cooling of food products poses a major challenge for the food processor, particularly when minimal destruction of the food product is desired.

Jacket cooling is an effective method of cooling food products if the temperature difference between the liquid and the food product is sufficient to create rapid heat transfer. This method of cooling works well down to a temperature approximately 35° C. above the temperature of the chilling liquid. If the chilling liquid is water at 5° C., the food product can be chilled down to about 40° C. efficiently. However, below 40° C. the cooling rate of the food product slows to the point that it is no longer commercially economical or practical.

FIG. 1 show the graph of the cooling curve for a thick onion and cheese sauce cooled in a jacketed vessel with 5° C. chilled water circulated through the jacket. The cooling rate is rapid for the initial thirty minutes and then levels off as the temperature difference between the food product and the chilled water is reduced. At about 40° C. the cooling rate is reduced to about 1° C. per minute, which is a marginal cooling rate in industrial food plants. If jacket cooling is continued, the cooling rate diminishes to the point that very little heat is transferred from the product to the coolant. Thus, it is impractical and inefficient to cool most food products from cooking temperature to 5° C. in 90 minutes.

Vacuum cooling is rapid at all temperatures. FIG. 2 shows the cooling curve for vacuum cooling of the same sauce as that measured in FIG. 1. The cooling rate is efficient at all temperatures and drops to 1° C. per minute rate only at a point quite close to the 5° C. temperature.

However, exclusive vacuum cooling is not without problems. At high temperatures vacuum cooling causes the product to boil violently. This violent boiling damages the food particulates in the product and splatters the inside surfaces of the vessel with sticky product. At high temperatures the product may be so unstable that if the vacuum is not precisely controlled, the product will explode into the vacuum vapor duct allowing significant amounts of product to be sucked out of the vessel and into the vacuum vapor duct. This reduces product yield and can distribute the product on the inside surfaces of the vacuum vapor duct all the way into the vacuum pump.

Controlling the vacuum process to reduce or eliminate the violent boiling is complicated. The only way to control the boiling is to slow the vacuum cooling process by reducing the vacuum level. However, any reduction of the vacuum level also slows the cooling process. Controlling the vacuum level without slowing the cooling process below a practical level is nearly impossible. An additional problem with vacuum cooling is that water moisture is evaporated out of the product during the vacuum cooling process. As the water is evaporated, flavor volatiles are also evaporated out thus reducing the flavor of the product. Jacket cooling does not take flavor volatiles out of the product.

It would be desirable, therefore, to combine jacket cooling and vacuum cooling in a method and apparatus to exploit the advantages and minimize the disadvantages of each method. By extracting most of the heat from the product with jacket cooling and using vacuum cooling for only the final stage of the chilling process, chilling efficiency is improved and fewer flavor volatiles are removed. Since the product is more stable at temperatures below the transition zone fewer flavor volatiles evaporate out at the lower temperatures.

DISCLOSURE OF INVENTION

The method and apparatus for chilling slurries and liquids of the present invention combines the jacket cooling process at higher temperatures with the vacuum cooling process at lower temperatures. When employing the method and apparatus of the present invention, jacket cooling is efficient in cooling the particulate food products down to temperatures approximately 35° C. above the temperature of the cooling liquid. At this point in the cooling process the jacket cooling rate slows to 1° C. per minute. (For the purposes of the present disclosure, the point at which the jacket cooling rate slows to 1° C. per minute will be called the 'transition zone'.) Below the transition zone the method of cooling the product is changed to chilling with vacuum.

The transition zone varies in temperature depending on several factors:

1) Heat transfer occurs more rapidly with a high temperature difference between the cooling liquid and the product being cooled. In general this temperature difference is approximately 35° C. However, this temperature difference will depend on the product. Non-viscous products chill efficiently with a lower temperature difference while cooling very thick products requires a higher temperature difference to result in a practical chilling rate.

2) If the vessel has a very high jacket area relative to the volume of product, the transition temperature will be a few degrees lower because of the improved efficiency of the cooling vessel itself.

3) If the design of the product mixing system is improved, the transition temperature will be lower. Improving product mixing improves heat transfer as does improving the performance of the mixing apparatus, e.g., agitators and scrapers. This improved heat transfer lowers the transition temperature where efficient jacket cooling rate becomes commercially practical.

Below the transition zone vacuum cooling is utilized and chills the product efficiently without violent boiling. Below the transition zone the cooling rate is slow enough to result in a very controlled boiling action even when a deep vacuum is created in the vessel. Since a very deep vacuum is required to create cooling below the transition temperature, it is desirable and possible to use a very efficient vacuum cooling system running at full efficiency without having any of the violent boiling problems that exist above the transition temperature. As a result the cooling rate with vacuum cooling is quite efficient.

FIG. 3 shows the cooling curve when jacket cooling and vacuum cooling is combined while chilling a thick food product. The jacket cooling rate of the product above the transition point is as rapid as it would be if vacuum cooling was used; therefore the cooling rate is not compromised by using this more stable method of cooling. The vacuum cooling rate below the transition zone maintains this cooling rate throughout most of the chilling process down to 5° C.

Thus the method of the present invention comprises cooling liquids and/or slurries by jacket cooling to a temperature where the cooling rate slows to 1° C. per minute and thereafter cooling from that temperature to 5° C. with by pulling a vacuum on the product.

The apparatus for accomplishing the combination jacket and vacuum cooling comprises a particulate food processing vessel largely encased by a double-walled jacket with refrigeration coils and through which refrigerant circulates during the jacket cooling phase, and a vapor outlet through which a vacuum is pulled during the vacuum chilling phase. The vessel is preferably adapted for use in both cooking and a cooling processes, in as much as the cooling jacket is perfectly well suited for the introduction of steam for heating. However, the inventive cooling cycle combination does not necessitate that the vessel be capable of use in cooking.

BEST MODE CARRYING OUT THE INVENTION

Figure 1:
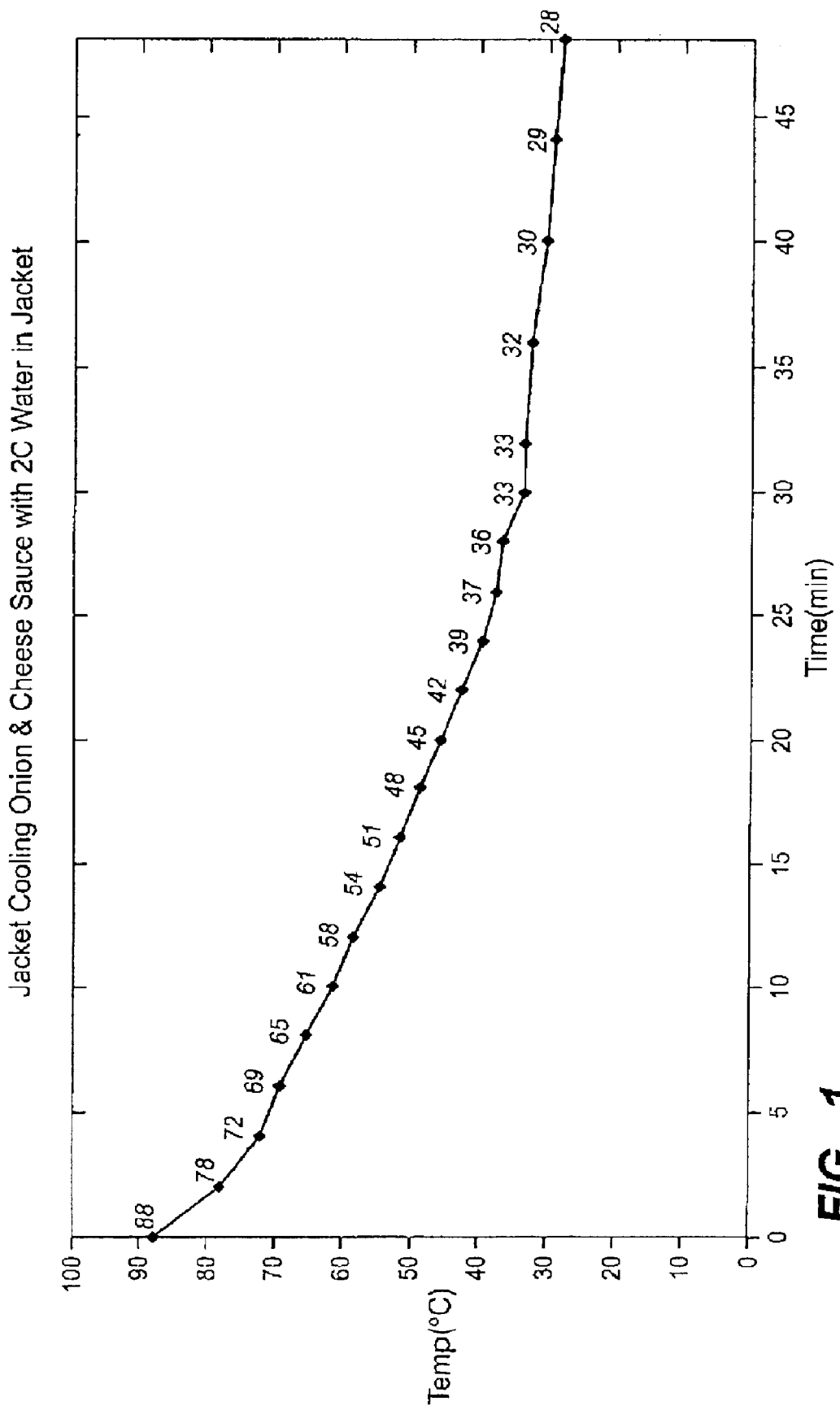
FIG. 1 is a graph depicting the cooling curve for a thick onion and cheese sauce cooled in a jacketed vessel with 5° C. chilled water circulated through the jacket.
Figure 2:
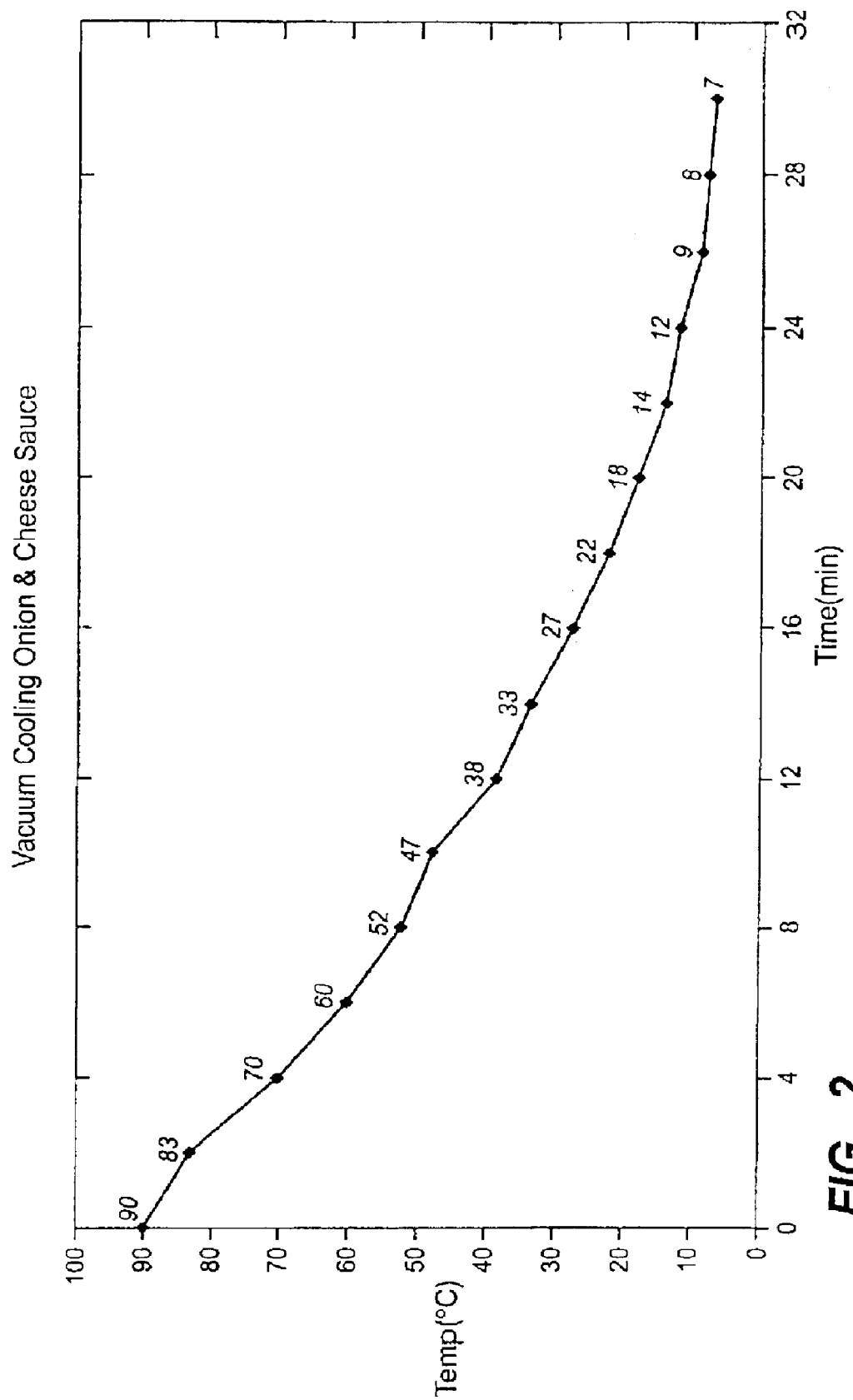
FIG. 2 is a graph depicting the cooling curve for vacuum cooling of the same onion and cheese sauce depicted in FIG. 1.
Figure 3:
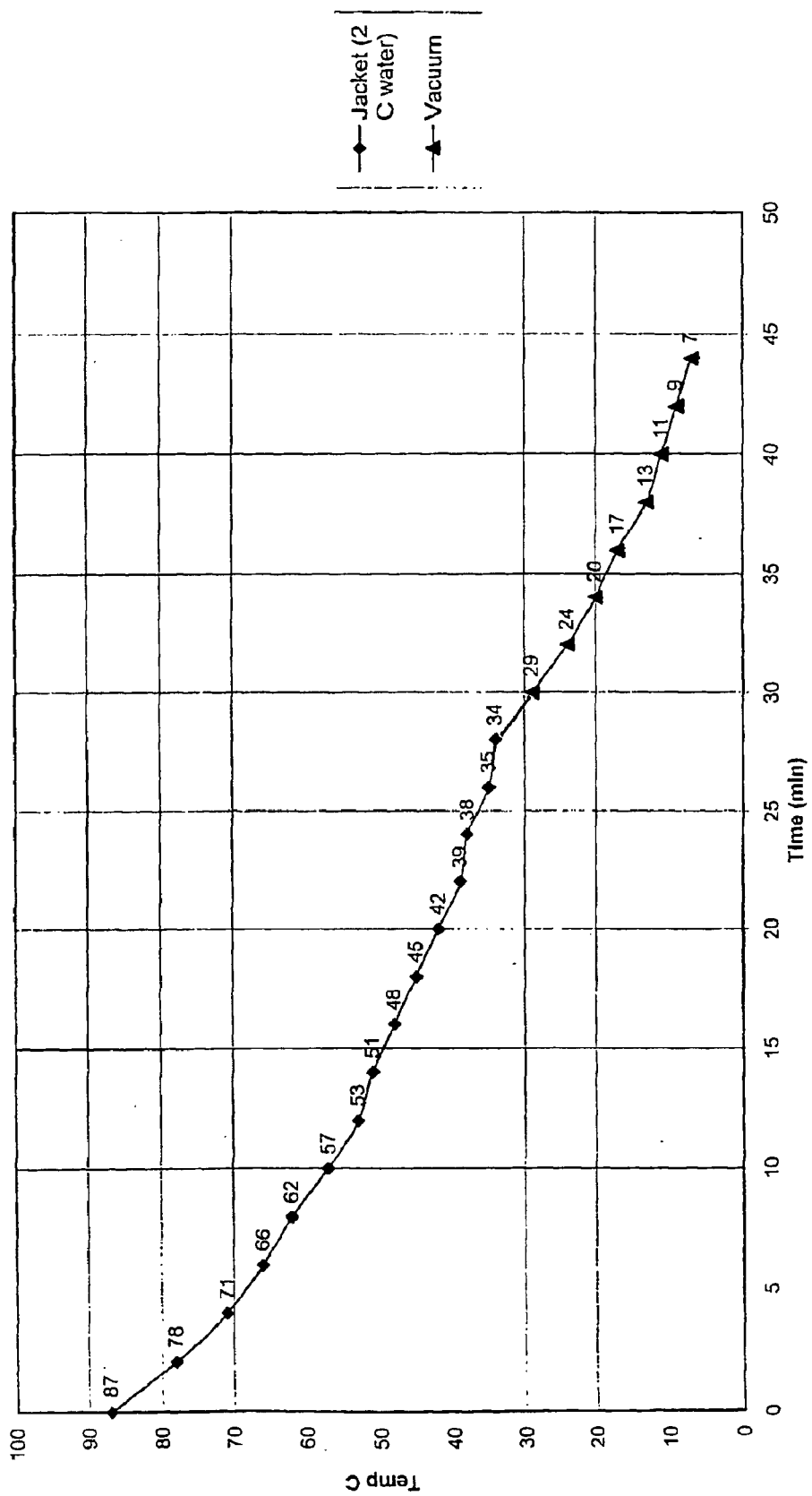
FIG. 3 is a graph depicting the cooling curve when jacket cooling and vacuum cooling are combined.
Figure 4:
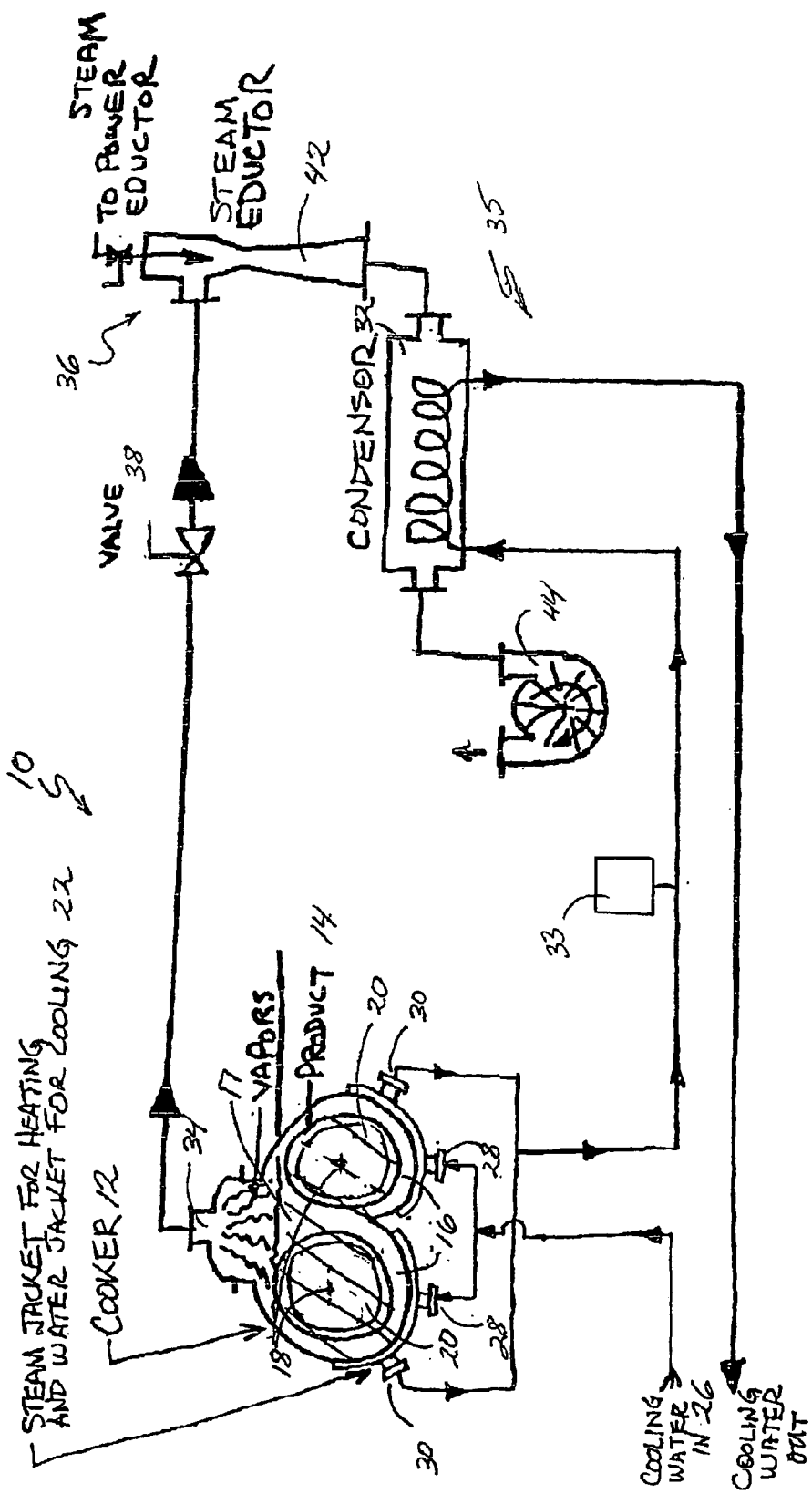
FIG. 4 is a schematic of the cooling and cooling apparatus that combines jacket and vacuum cooling functions.
Figure 6:
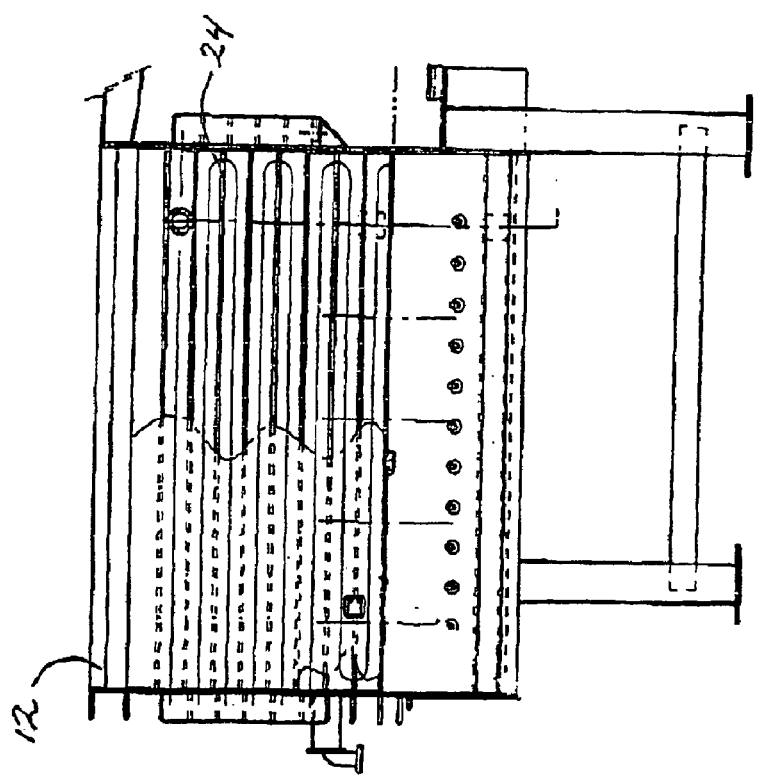
FIG. 6 is a partial cross sectional side view in elevation of the vessel of FIG. 5.
Figure 5:
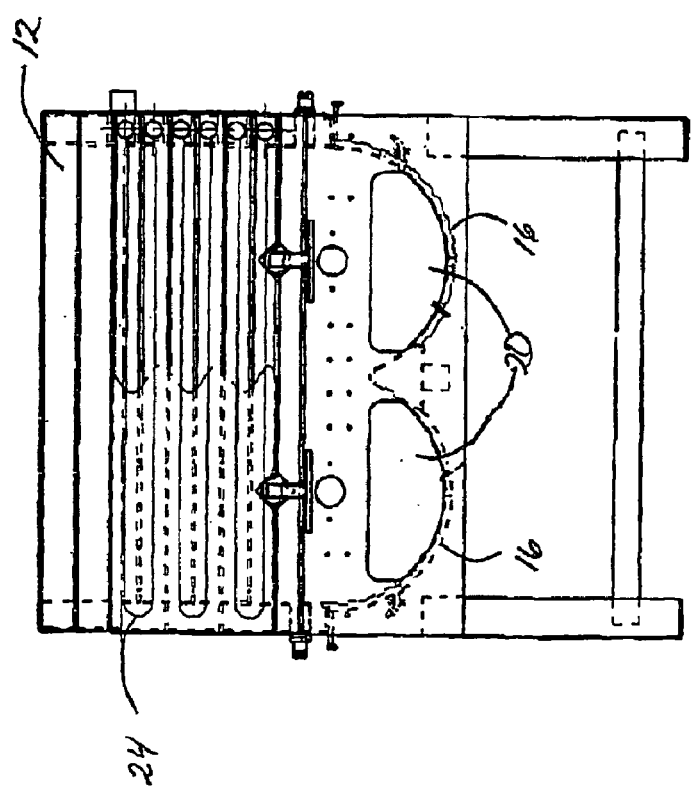
FIG. 5 is a partial cross sectional end view in elevation of the cooking/cooling vessel showing the cooling jacket of the vessel.

FIG. 4 provides an overall view of the apparatus for combining jacket and vacuum cooling of slurries and liquids of the present invention. This view shows that the system 10 comprises a cooker/cooler 12 in which the processing of particulate food product 14 takes place. The cooker/cooler shown has twin arcuate troughs 16 which define the cooking/chilling chamber 17, each of said troughs having longitudinally disposed drive shafts 18 with agitators 20 for mixing the food product. The agitators (shown on end in FIGS. 4 and 5) may be a helical ribbon or blades having attached scrapers, but the general objective is to employ a mixing system that brings the agitators and scrapers into engagement with a substantial portion of the vessel's interior surface to ensure thorough mixing throughout the chilling cycle. While this kind of vessel is preferable and has been shown to be well-adapted for use with the combination cooling system herein disclosed, it will be understood by those with knowledge in the art that any of a number of vessel configurations could employ a combination jacket and vacuum cooling system.

The vessel is surrounded in part by a jacket 22, which preferably doubles as a cooking and a cooling jacket: It introduces heat into the food product during the cooking cycle through the circulation of steam through a serpentine conduit 24; it removes heat during the jacket cooling phase of the cooling cycle by circulating a refrigerant through the conduit. When the vessel is a combination cooker/cooler, the refrigerant is chilled water, as switching from steam to an industrial refrigerant, such as ammonia, Freon-11, Freon-12, carbon dioxide or sulphur dioxide, is impracticable. If the vessel is strictly a cooling vessel into which pre-cooked particulates are introduced for chilling, then use of industrial refrigerants may be preferable, though it is by no means necessary.

After cooking is complete and while product temperature remains high, jacket cooling is commenced by introducing cooling water 26 into inlets 28 at the base of the jacket 22 and removing it via outlets 30 and conveying it to and through a condenser 32 for recirculating. Refrigerant inlets and outlets may be located wherever suitable. Means (a refrigeration system 35) for cooling and circulating the refrigerant are well known in the art and are thus depicted only summarily and schematically on FIG. 4 as condenser 32 and pump 33.

The jacket phase of the cooling process continues until the cooling rate for the food product slows to 1° C. per minute. This temperature is known in advance so that transitioning from jacket to vacuum cooling is immediate upon reaching the threshold temperature. At that point, vacuum cooling of the product is commenced and continues to the completion of the cooling cycle, generally when the product reaches approximately 5° C. or at any other temperature desired by the user. The vacuum chilling is accomplished by taking pressure from vessel 12 through vapor outlet 34 with a vacuum system 36, as is well known in the art. The rudiments of the vacuum system are depicted schematically by a valve 38 which is open during the vacuum chilling cycle, steam eductor 42, and vacuum pump 44. Steam vapors from the cooking vessel are introduced into a steam eductor (or ejector) 42, which may be singular or in combined in multiple series with condenser to reach extremely low pressures, and in which a low pressure exists due to the vacuum pulled by pump 44.

It should be understood that there may be advantages in combining jacket cooling and vacuum chilling in the concluding phase of the chilling process. Accordingly, the present invention includes the combination of simultaneous jacket cooling and vacuum chilling. In fact, there is nothing imperative in terminating jacket cooling before commencing vacuum chilling. As a practical matter, jacket cooling simply becomes ineffective at certain product/coolant temperature differentials, and vacuum chilling is so much more effective that it essentially overshadows any contribution by jacket cooling when the two are combined.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed as invention is:

1. A method of cooling particulate food products in a vessel, said method including a jacket cooling phase and a vacuum chilling phase, said method comprising the steps of:

jacket cooling the products to a predetermined temperature;

and thereafter vacuum chilling the products by employing a vacuum system including a vacuum pump to pull a vacuum on the vessel.

2. The method of claim 1 wherein said jacket cooling step is continued until the cooling rate slows to 1° C. per minute and thereafter cooling from that temperature to 5° C. by vacuum chilling.

3. The method of claim 1 wherein said jacket cooling step is continued until the cooling rate slows to 1° C. per minute and thereafter cooling from that temperature to 5° C. by a combination of jacket cooling and vacuum chilling.

4. A system for combining jacket cooling with vacuum chilling of particulate food products, said system comprising:

a vessel 12 having an interior chamber 17;

agitation means 20 for mixing and stifling particulate product within said vessel;

a cooling jacket 22 encapsulating a portion of said vessel, said cooling jacket in fluid communication with a refrigeration system 35;

a vapor outlet 34 which brings the interior chamber 17 of said vessel 12 into fluid communication with a vacuum system 36; and a vacuum system in fluid communication with said vapor outlet for vacuum chilling the particulate food products, said vacuum system including a vacuum pump for pulling a vacuum on said interior chamber of said vessel.

5. The system of claim 4, wherein said vessel 12 has twin arcuate troughs 16.

6. The system of claim 5, wherein each of said troughs 16 has a longitudinally disposed drive shaft 18 with agitators 20 for mixing the particulate product.

7. The system of claim 6 wherein said agitators are helical ribbons having attached scrapers.

8. A method of chilling particulate food product in a cooking vessel, comprising the following steps, in order:

jacket cooling the product to a predetermined point based on a factor or factors selected from the group consisting of product temperature, product cooling rate, and the temperature differential between the product and the jacket cooling system coolant, or a combination thereof; and when said predetermined point is reached, employing a vacuum system including a vacuum pump to pull a vacuum on the cooking vessel and vacuum chilling the product.

9. The method of claim 8, wherein said jacket cooling step is continued until the cooling rate slows to 1° C. and thereafter cooling from that point by vacuum chilling.

10. The method of claim 9, wherein said vacuum chilling step continues until the product reaches a temperature ranging between 10° C. and 5° C., inclusive.

11. The method of claim 9, wherein said vacuum chilling step continues until the product reaches a temperature of approximately 5° C.

12. The method of claim 8, wherein said jacket cooling step is continued until the temperature of the product being chilled is at or below 40° C.

13. The method of claim 8, wherein said jacket cooling step is continued until the temperature differential between the product being chilled and the coolant in the jacket cooling system is approximately 35° C.

14. The method of claim 8, wherein said jacket cooling step continues after said vacuum chilling step commences.

* * * * *